Nov. 23, 1948.  G. R. SHOWALTER  2,454,675
DISK HARROW CARRIER
Filed May 6, 1946  2 Sheets-Sheet 1
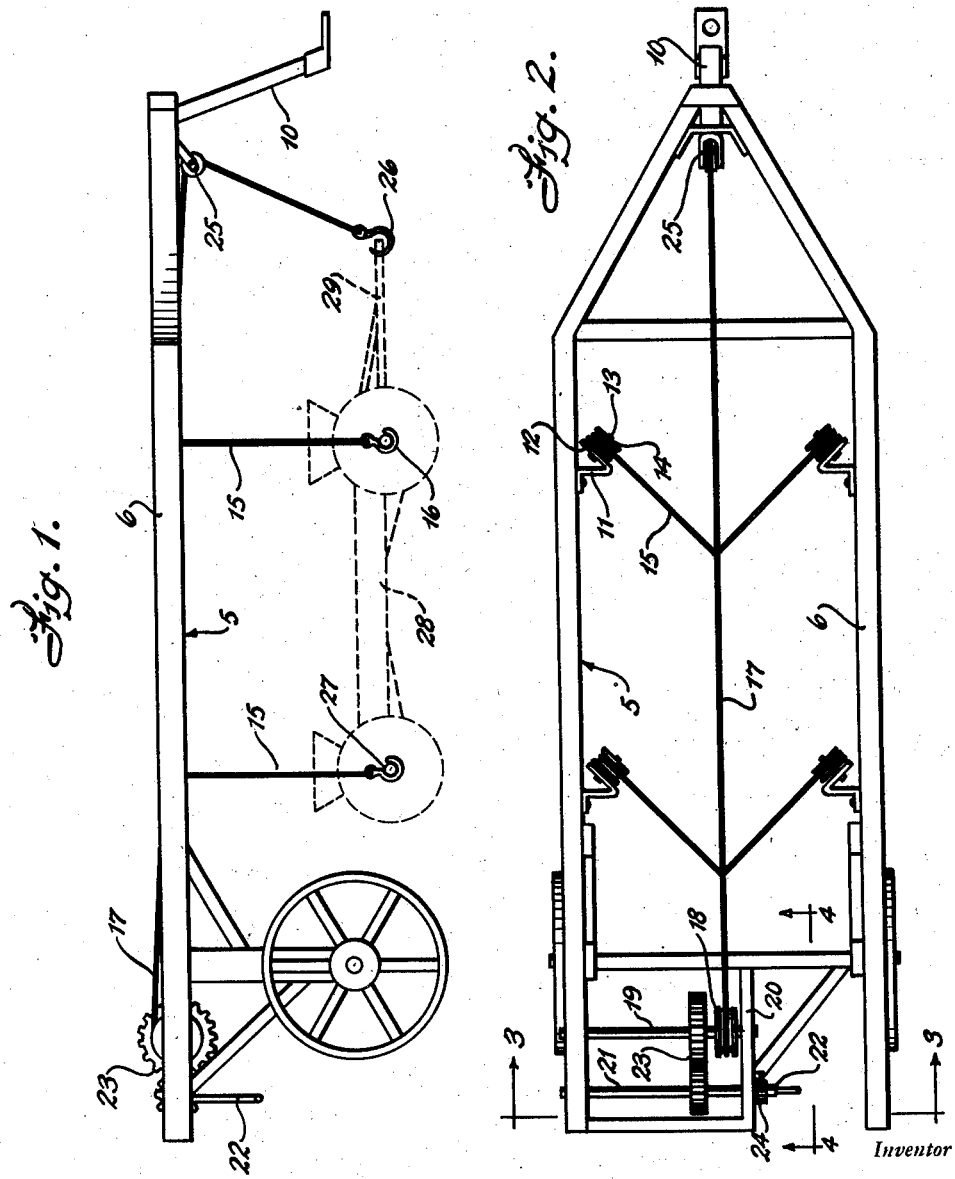
Inventor
Galen R. Showalter.
By Clarence A. O'Brien
and Harvey B. Jacobson
Attorneys Nov. 23, 1948.   G. R. SHOWALTER   2,454,675
DISK HARROW CARRIER
Filed May 6, 1946   2 Sheets-Sheet 2

Inventor
Galen R. Showalter.

By *Clarence A. O'Brien
and Harvey B. Jacobson*
Attorneys

Patented Nov. 23, 1948

2,454,675

UNITED STATES PATENT OFFICE 2,454,675

DISK HARROW CARRIER

Galen R. Showalter, Roanoke, Va.

Application May 6, 1946, Serial No. 667,559

2 Claims. (Cl. 214—75)

The present invention relates to new and useful improvements in disc harrow carriers designed for transporting the harrow to and from the field.

An important object of the present invention is to provide a trailer adapted for coupling to a tractor or other road vehicle and in which the trailer embodies hoisting means for raising the harrow above the ground and supporting the same in an elevated position while the harrow is transported from place to place.

A further object of the invention is to provide a novel hoisting apparatus for the harrow and in which a plurality of hooks and cables are arranged for engaging the ends of the shafts of the harrow as well as for engaging the tongue of the harrow and utilizing a single drum for winding all of the cables during the lifting or hoisting of the harrow.

A still further object of the invention is to provide a device of this character, of simple and practical construction, which is strong and durable, efficient and reliable in use and otherwise well adapted for the purposes for which the same was intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 4:
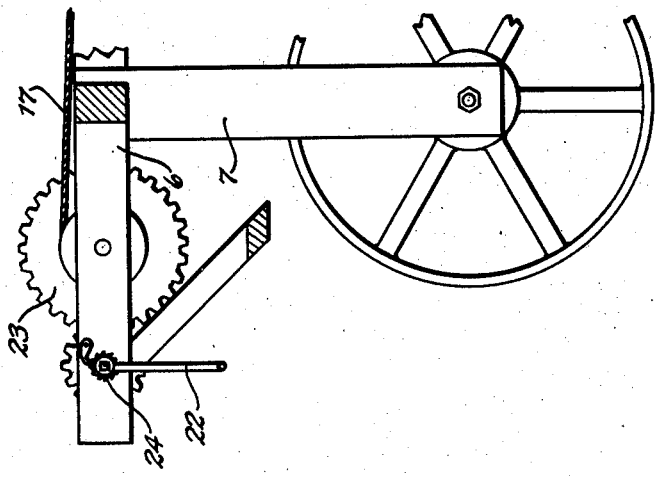
Figure 4 is a fragmentary sectional view taken on a line 4—4 of Figure 2.
Figure 3:
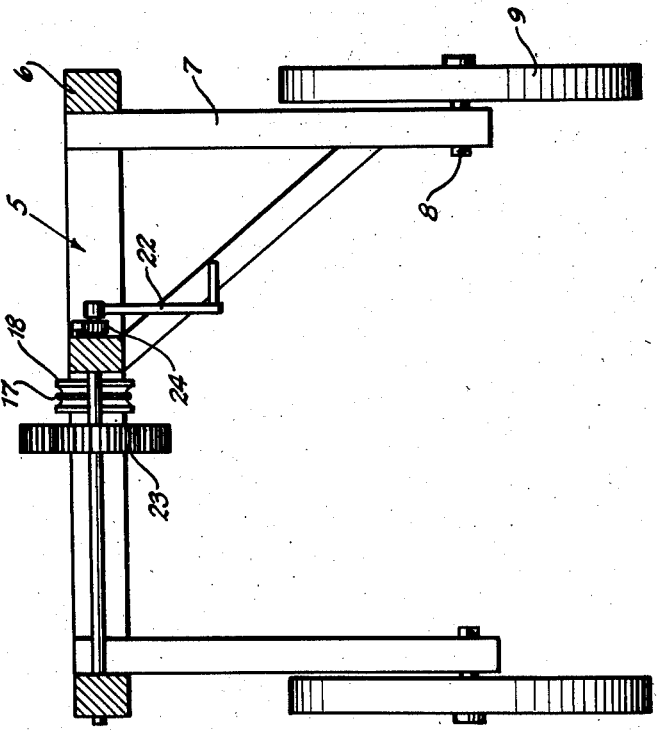
Figure 3 is a transverse sectional view taken on a line 3—3 of Figure 2.

Referring now to the drawings in detail, wherein for the purpose of illustration I have disclosed a preferred embodiment of the invention, the numeral 5 designates the trailer generally which includes a frame 6 having a pair of vertical frame members 7 extending downwardly from the sides of the frame at its rear portion, the lower portion of the vertical frame members 7 having stub-axles 8 secured therein on which the wheels 9 are journalled.

A tongue 10 is secured to the front end of the frame 6 and by means of which the trailer may be coupled to a tractor or other towing vehicle.

A plurality of brackets 11 are secured to the inside of the frame 6 at each side thereof, each of the brackets including an inclined arm 12 on which pins or shafts 13 are supported in a forwardly and inwardly inclined position and on which pulleys 14 are journalled.

A cable 15 is trained over each of the pulleys 14, the lower end of each cable having a hook 16 attached thereto and the other ends of the cables are connected to a main cable 17 which extends longitudinally at the center of the frame 6 and with its rear end connected to a drum 18 for winding thereon.

The drum 18 is secured on a transverse shaft 19 journalled in an auxiliary frame or bracket 20 at the rear end of the trailer 5 and in which is also journalled a second shaft 21 operated by a crank handle 22 and operatively connected to the shaft 19 by gears 23. A conventional form of pawl and ratchet mechanism 24 is also connected to the shaft 21.

The front end of the main cable 17 extends over a pulley 25 mounted at the front end of the frame 6 and to the lower end of the cable is attached a hook 26.

In the operation of the device the hooks 16 of the cables 15 are suspended adjacent the sides of the frame 6 and are adapted for engaging the ends of the shafts 27 of a conventional form of disc harrow 28. The hook 26 is positioned for engaging the tongue 29 of the harrow.

By operating the handle 22 in a manner to wind the cable 17 on the drum 18, the hooks 16 and 26 of the cables 15 and at the front end of the cable 17 will simultaneously be raised whereby to lift the harrow 28 above the ground and to support the same in a suspended position below the frame 6 of the trailer 5. The harrow may then be transported to and from a field, or to any desired location.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what is claimed as new is:

1. A trailer comprising a frame, pulleys journalled at the sides of the frame with their axes inclined forwardly of the frame, a single pulley at one end of the frame, a drum mounted at an opposite end of the frame, a main cable attached to the drum for winding thereon and trained over said single pulley, and branch cables attached to the main cable and trained over said side pulleys, said cables being adapted for attaching to an object for hoisting the same into position under the frame.

2. A trailer comprising an elongated frame, pulleys journaled at the sides of the frame, a single pulley at one end and in the longitudinal center of the frame, a drum mounted at the other end of the frame, a main cable in the longitudinal center of the frame attached to said drum for winding thereon and having one end trained over said single pulley, branch cables extending from said main cable to the pulleys at the sides of the frame and having ends trained over said pulleys, and means on the ends of the cables for attachment to an object to be hoisted.

GALEN R. SHOWALTER.

REFERENCES CITED

The following references are of record in the file of this patent:

UNITED STATES PATENTS

| Number | Name | Date |
| --- | --- | --- |
| 367,009 | Marrs | July 19, 1887 |
| 1,180,206 | Takacs | Apr. 18, 1916 |
| 1,609,625 | Lawes | Dec. 7, 1926 |
| 2,071,503 | Dalton | Feb. 23, 1937 |
| 2,164,550 | Steward | July 4, 1939 |
| 2,266,866 | Houston | Dec. 23, 1941 |
| 2,276,127 | Wahl | Mar. 10, 1942 |
| 2,321,198 | Graves | June 8, 1943 |
| 2,398,147 | McKay | Apr. 9, 1946 |
| 2,404,898 | Aycock | July 30, 1946 |